May 10, 1960  J. SCHICK  2,935,774
HINGED CONNECTING MEANS FOR BELTS
Filed March 10, 1955  3 Sheets-Sheet 1
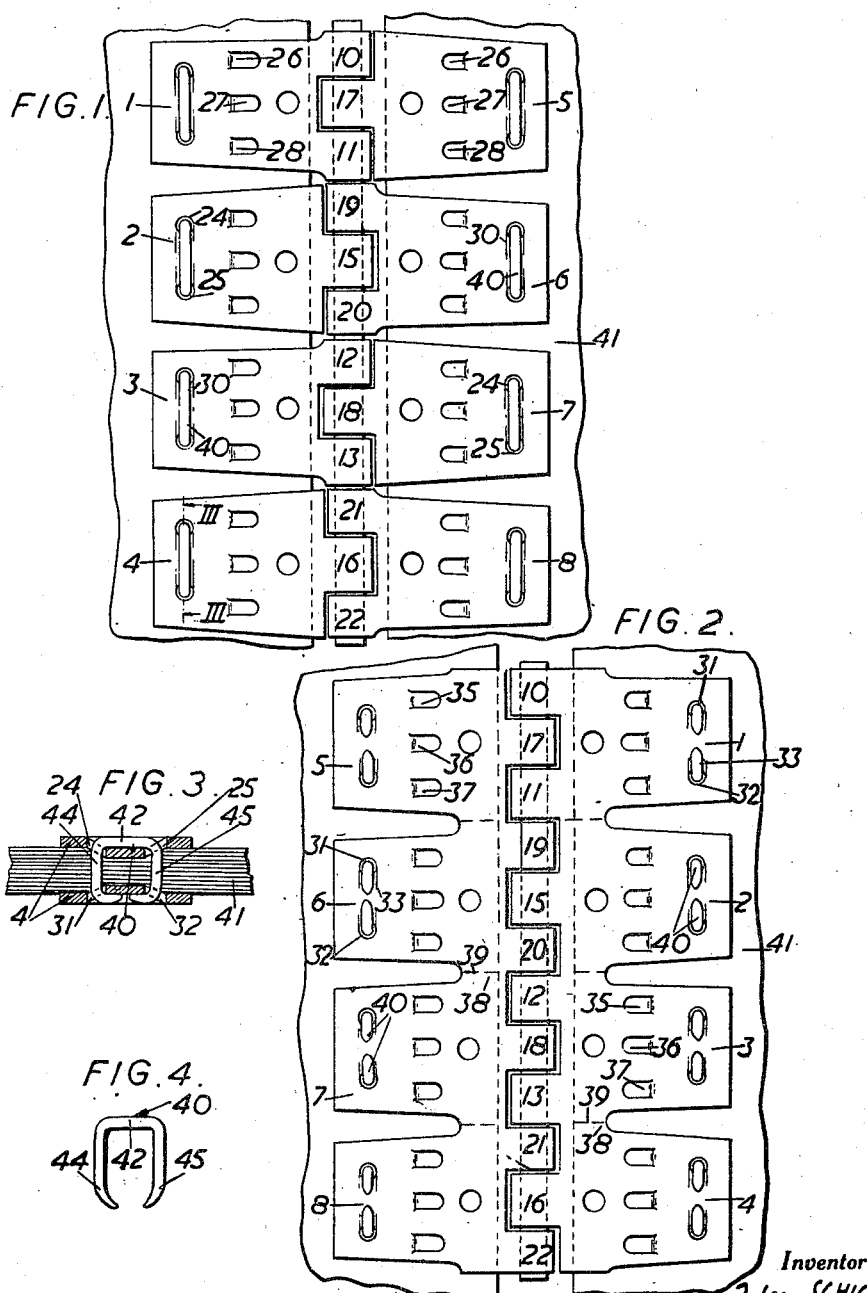
Inventor
Jules SCHICK
By
Attorney May 10, 1960 J. SCHICK 2,935,774
HINGED CONNECTING MEANS FOR BELTS
Filed March 10, 1955 3 Sheets-Sheet 2
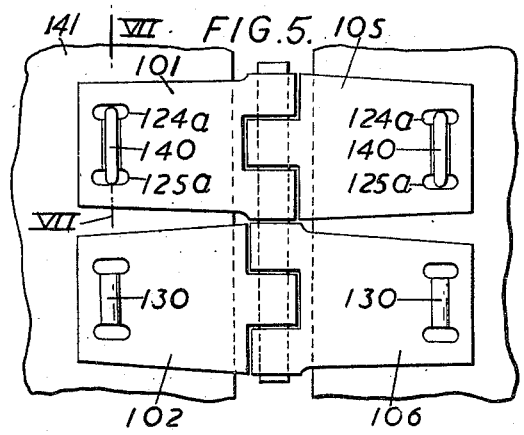
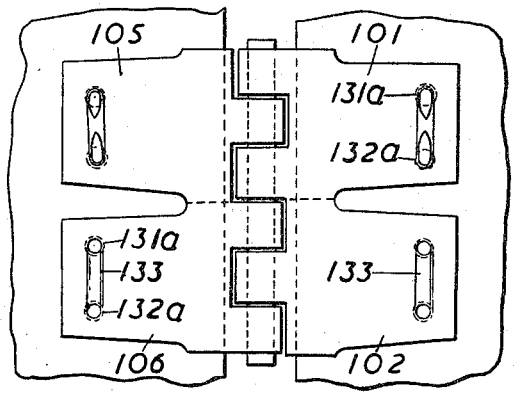
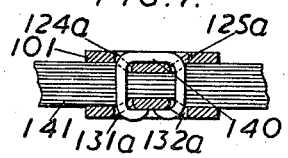
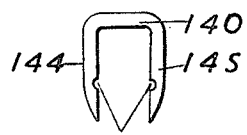
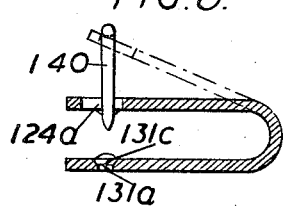
Inventor
Jules SCHICK
By
Attorney Inventor
Jules SCHICK
By
Attorney

United States Patent Office 2,935,774
Patented May 10, 1960

1

2,935,774

HINGED CONNECTING MEANS FOR BELTS

Jules Schick, Vincennes, France, assignor to Goro Société Anonyme, Paris, France, a corporation of France Application March 10, 1955, Serial No. 493,489

Claims priority, application France March 18, 1954

10 Claims. (Cl. 24—33)

The present invention relates to means for hingedly connecting the ends of industrial belts, for example driving belts, conveyer belts.

It is an object of the invention to provide such connecting means which are simple and easy to manufacture.

It is another object of the invention to provide such connecting means which are easy to attach to the ends of conveyer belts and yet are firmly secured thereto.

It is a further object of the invention to provide such connecting means which, although firmly secured to the ends of conveyer belts, allow a certain play of the ends under stress.

It is still another object of the invention to provide such connecting means which, especially when used on conveyer belts for transporting coal or other materials in mining, allow a conveyer belt to assume a trough-like shape.

It is still a further object of the invention to allow the connecting means to be easily matched by a user to the width of the belt ends to be connected.

These and other objects and advantages of the invention will become apparent to those skilled in the art from the following detailed description of the invention when read in conjunction with the appended drawings, in which:

Fig. 1 is a top plan view of a belt fastener of the invention applied to two belt ends;

Fig. 2 is a corresponding underneath plan view;

Fig. 3 shows a section taken along the line III—III of Fig. 1;

Fig. 4 shows a staple-like clamp for attaching the fastener to the belt ends;

Figs. 5 and 6 are views corresponding to Figs. 1 and 2 respectively of a modified belt fastener;

Fig. 7 shows a section along the line VII—VII of Fig. 5;

Fig. 8 shows a section perpendicular to that of Fig. 7, the clamp being shown in side view just prior to being clinched;

Fig. 9 is a front view of the clamp;

Fig. 10 is a similar view of a modified clamp;

Figure 11:
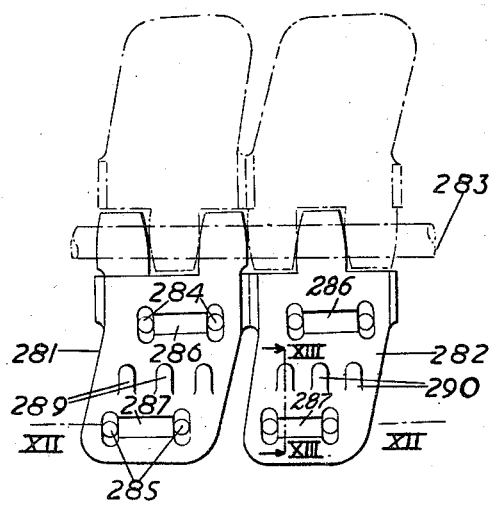
Fig. 11 is a top plan view of another modified belt fastener.

The belt fastener of Figs. 1, 2, 3 and 4 of the drawings comprises a first hinge portion having a plurality of eyelet elements 1, 2, 3, 4 arranged side by side in a row and a second hinge portion having a plurality of eyelet elements 5, 6, 7, 8 arranged side by side in another row. All the eyelet elements are in the general shape of a U. The eyelet elements 1, 2, 3, 4 of the first row straddle with their parallel branches an end of an industrial belt, for example of a conveyer band. The eyelet elements 5, 6, 7, 8 of the other row straddle with their parallel branches another belt end hingedly connected by the belt fastener to the first belt end. The belt ends may be the ends of one and the same belt portion or they may

2 be adjacent ends of different belt portions. The eyelet elements 1 and 3 of odd order of the first row each have two eyelets 10, 11 and 12, 13 respectively. The eyelet elements 2 and 4 of even order of the first row each have a single eyelet 15 and 16 respectively. The eyelet elements 5 and 7 of odd order of the other row each have a single eyelet 17 and 18 respectively received in the spaces between the two eyelets 10, 11 and 12, 13 respectively of the corresponding eyelet elements 1 and 3 of the first row. The eyelet elements 6 and 8 of even order of the second row each have two eyelets 19, 20 and 21, 22 respectively and receive in the spaces between them the single eyelet 15 and 16 respectively of the corresponding eyelet elements 2 and 4 of the first row. A hinge pin in the shape of a rod, cable, wire or the like is passed through all the aligned eyelets.

Each of the eyelet elements on its upper branch shown in Fig. 1 has a pair of holes 24, 25 aligned parallel to the axis of the hinge pin and arranged near the edge of the eyelet elements remote from the eyelets. From each of the said upper branches three prongs 26, 27 and 28 are struck out and are inclined towards the respective lower branches shown in Fig. 2 of the eyelet elements. The points of the prongs 26, 27 and 28 are directed towards the hinge pin. The two holes 24, 25 are connected by a groove 30 substantially parallel to the hinge pin.

The lower branches of the eyelet elements shown in Fig. 2 have a pair of holes 31, 32 registering respectively with the pair of holes 24, 25 of the upper branches. The holes 31 and 32 are connected by a groove 33. Prongs 35, 36 and 37 are struck out from each lower branch and are inclined towards the respective upper branches. The points of the prongs 35, 36 and 37 are directed towards the hinge pin. The prongs 26, 27 and 28, and the prongs 35, 36 and 37 lie between the respective eyelets and the pairs of holes.

The lower branches of the eyelet elements are interconnected to one another by bridge portions 38, the branches and the intermediate bridge portions being unitary. Each bridge portion 38 is weakened at 39, for example by scoring or otherwise grooving, perpendicularly to the hinge pin. The eyelet elements of each row form an interconnected unitary hinge portion, but due to the weakening at 39, a hinge portion can be broken into pieces of desired lengths. Moreover, the hinge portion or each of such pieces thereof formed by a plurality of eyelet elements is resilient owing to the weakening of the bridge portions. When in use of the belt a stress is exerted perpendicularly to the belt surface, as may occur in conveyer belts for mining purposes, the bridge portions can easily break where weakened whereby the belt is permitted to assume a trough-like shape.

As can be seen from the drawings, the two hinge portions are identical, the eyelet elements having each two eyelets of one of the hinge portions corresponding to eyelet elements having each a single eyelet of the other hinge portion.

As shown in Fig. 3, a clamp 40 is passed through the pairs of holes 24, 25 and 31, 32 and is clinched in the manner of a staple for resiliently fixing the hinge portions to the respective belt end 41. The clamp 40 (see Fig. 4) is initially shaped like a staple and is made of metal wire. It comprises a base 42 provided with two limbs 44, 45 of equal lengths ending in points which are slightly bent towards each other.

When the clamp 40 is in position (see Fig. 3), the base 42 of the clamp is accommodated in the groove 30 of the upper branch of the respective eyelet element while the two points of the limbs 44, 45 are bent over towards each other and are accommodated in the groove 33 of the lower branch of the eyelet element.

The holes 24, 25, 31 and 32 through which the clamps pass are of essentially greater diameter than that of the metal wire from which the clamps are made. This allows material, for example rubber, of the belt ends 41 to penetrate into the free portions of these holes between the clamps and the walls defining these holes.

For fixing a hinge portion on the belt end 41, the belt end 41 is introduced between the opposite branches of the hinge portion. A clamp 40 is introduced into each of the pairs of holes 24, 25 in the upper branches of the hinge portion. By means of a hammer, the pointed ends of the clamps 40 are driven through the belt end and the pairs of holes 31, 32 in the lower branches of the hinge portion and are bent over, the bending over being facilitated by the points of the clamp being initially slightly bent towards each other as shown in Fig. 4. A clamp finally assumes the position shown in Fig. 3 in which the clamp 40 holds the belt end 41 sandwiched between the upper and lower branches of the hinge portion.

After two hinge portions have been attached to two belt ends, one to each, as just described, the two hinge portions are brought together until the eyelets of one hinge portion lie in the spaces between those of the other hinge portion (except for the last eyelet at each side of the belt ends). The aligned eyelets of both hinge portions are then hingedly connected by a hinge pin passed transversely through the eyelets as shown in Figs. 1 and 2. The hinge pin may be a length of cable or a rod or wire which is preferably flexible, for example a flexible metal rod.

When a tension is exerted on the belt ends in their longitudinal direction the prongs 26, 27, 28 and 35, 36, 37 bite into the material, for example rubber, of the belt ends in a direction opposed to that of the tension. In combination with the pairs of holes 24, 25 and 31, 32, which receive the clamps 40 and which have a larger diameter than that of the wire of which the clamps are made, the prongs play the role of brakes when the tension is exerted at the region of the belt ends. In other words the clamps and the points of the prongs co-operate in retaining the belt ends in the hinged belt fastener under a tension which tends to separate the belt ends in their longitudinal direction from the belt fastener.

Moreover, when such a tension is suddenly applied, then first the clamps react and take up the tension and subsequently the prongs come into play and provide for a certain resiliency owing to the fact that their points penetrate into the adjacent faces of the belt ends. Moreover, when the belt ends are made of rubber or similar resilient material the material has the tendency of sliding into the openings obtained when striking out the tongues from the branches, and when the tension ceases the material of the belt ends assumes its initial place.

Each hinge portion forms a one-piece unitary structure which can easily be broken into pieces of a desired width comprising a predetermined number of eyelet elements owing to the weakening at 39 of the bridge portions 38.

The hinges formed by the fastener described are remarkably pliable when in use.

Tests have shown that the clamps should be suitably positioned relatively to the edge of the respective belt end. The distance of the clamp from this end has to be at least 10 times the diameter of the wire forming the clamps in order to prevent any rupture of the belt end at its edge.

Figs. 5, 6, 7 and 8 illustrate a belt fastener which is generally similar to that of Figs. 1, 2 and 3, but is modified with respect to some details. The belt fastener of Figs. 5, 6, 7 and 8 comprises eyelet elements 101, 102, 105, 106 which are attached to the respective belt ends 141 solely by means of the clamps 140, the prongs provided in the first embodiment being omitted. For simplifying the drawings, Figs. 5 and 6 show only two eyelet elements of each hinge portion, the eyelet elements 101 and 102 forming part of one, and the eyelet elements 105 and 106 forming part of the other hinge portion. Each of these eyelet elements comprises on its upper branch shown in Fig. 5 a pair of holes 124a, 125a arranged on a line parallel to the hinge pin and disposed near the edge remote from the eyelets. Contrary to the pair of holes 24, 25 of the first embodiment each hole of the pair of holes 124a, 125a is not circular, but is elongated in the direction perpendicular to the hinge pin for a purpose which will be explained further below. A central part of each hole 124a is connected to the corresponding central part of the hole 125a by a recess 130 parallel to the hinge pin. This detail is best visible on the branches 102 and 106 shown in Fig. 5 since here the clamps 140 for fixing these branches have been omitted for clarity.

The lower branch of each eyelet element shown in Fig. 6 has a pair of holes 131a and 132a registering with the central portion of the holes 124a and 125a of the corresponding upper branch. Each of the holes 131a and 132a is broadended conically towards the internal face of the lower branch of each eyelet element as shown at 131c in Fig. 8 with respect to the hole 131a. When the hinge portions are attached to the belt ends 141, their upper and lower branches are substantially parallel to each other and lie on one side and the other of the belt ends. However, before they are attached the upper and lower branches are spread apart and are approximately in the shape of a V, the upper branches occupying a position indicated by chain-dotted lines in Fig. 8 for facilitating the positioning of the hinge portions on the belt ends prior to their attachment. After a belt end has been introduced between the upper and lower branches of a hinge portion, the upper branches are bent on to the belt end to assume its final position.

Now, the elongated shape of the holes 124a and 125a permits a clamp 140 when inserted into a pair of holes 124a, 125a to point with its ends perpendicularly towards the belt end, although the upper branches of the hinge portion have not yet been bent on to the belt end as indicated in Fig. 8. Thereby it becomes possible, simultaneously to bend an upper branch onto the belt end and to drive the corresponding clamp substantially perpendicularly through the belt end.

For this purpose a clamp 140 is placed perpendicularly against that end of the oblong holes 124a and 125a which is remote from the hinge pin (see Fig. 8). During the bending of an upper branch of the hinge portion, the respective clamp remains substantially perpendicular to the belt end owing to the oblong shape of the holes 124a and 125a.

The conical portion at 131c of the hole 131a and the corresponding conical portion (not shown) of the hole 132a facilitate the engagement of the two points of the limbs 144 and 145 of a clamp in the holes 131a and 132a. The holes of each pair of holes 131a, 132a are connected by a recess 133 (Fig. 6).

The clamps used may be in the shape shown in Fig. 4, or else they may be in the shape shown in Fig. 9 or 10. The clamps 140 and 140' shown respectively in Figs. 9 and 10 have a weakening deformation on each of their limbs 144, 145 and 144', 145' respectively for facilitating the bending of the limbs towards each other. The weakening deformation is provided at the region where the bending takes place.

The clamp 140 of Fig. 9 has a weakening depression 164 pressed or otherwise formed on the inner side of each of its limbs 144 and 145. These depressions which correspond to a reduction of the transverse cross-section of the limbs 144 and 145 facilitates the bending of the limbs towards each other.

Fig. 10 shows another clamp 140', the limbs 144' and 145' of which are slightly curved at 164' whereby a depression is obtained on the inner sides of the limbs 144' and 145'. This deformation likewise facilitates the bending of the limbs towards each other.

Figure 12:
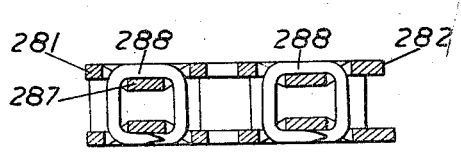
Fig. 12 is a section along the line XII—XII of Fig. 11.
Figure 13:
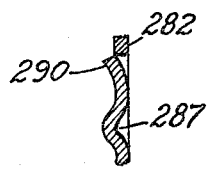
Fig. 13 is a section along the line XIII—XIII of Fig. 11.

Figs. 11, 12 and 13 illustrate a further modification of a hinge portion.

As is shown in Fig. 11, two successive eyelet elements of a hinge portion are connected by a hinge pin 283 to eyelet elements of a similar hinge portion indicated in broken lines. Each branch 281 and 282 of the eyelet elements has a portion adjacent and perpendicular to the hinge pin 283 and a portion that extends obliquely to the hinge pin. Two clamps 288 serve for fixing each eyelet element to a belt end and pass through two pairs of holes 284 and 285, the holes of each pair lying on a rectilinear line substantially parallel to the hinge pin 283, corresponding holes of the pairs lying on a rectilinear line extending obliquely to the hinge pin, whereby the pairs of holes are laterally displaced relatively to each other by half the distance separating the two limbs of each clamp 288. The holes of each pair are connected by recesses 286 and 287 respectively.

As shown in Fig. 12, each clamp 288 passes through a pair of holes, such as 284 or 285 of Fig. 11, in the upper branch of an eyelet element and through a similar pair of holes in the lower branch of the eyelet element, each pair of holes in the lower branch being connected by a recess similar to the recess 286 or 287. The bases and the bent over ends of the limbs of the clamps being accommodated in the said recesses. As shown in Fig. 12, the bent ends of the limbs of a clamp 288 overlap each other.

The eyelet elements 281 and 282 have prongs 289 and 290 respectively which are struck out from the respective branches, the points of the prongs being directed towards the hinge pin (see Fig. 13), the prongs lying between the recesses 286 and 287.

The arrangement just described has the advantage that the resistance of an eyelet element subjected to stress in the longitudinal direction of the belt ends may be considerably increased when for its fixing two or more clamps are used instead of a single one. However, this statement is only correct when the different clamps are laterally displaced relatively to one another. If the clamps were clinched around one and the same axis perpendicular to the hinge pin, the resistance to stress would remain almost the same as that which existed with a single clamp, since the second clamp would follow in the trace of the first clamp and when it has arrived at the initial position of the first clamp its further resistance would be zero.

At first sight it would seem to be easy to enlarge the eyelet elements which would permit the arrangement of two clamps side by side with the result of a considerable increase of the resistance against stress of the eyelet element. However, tests have shown that the conclusion is deceptive. If the size of the eyelet elements is increased so as to be able to position two clamps side by side, then for a given overall width of the hinge portion obviously only about half the number of eyelet elements can be provided. Each eyelet element offers a greater resistance against a stress than that of an eyelet element having only a single clamp, but since the number of eyelet elements has been reduced it will be recognized that, in the example given, the result is that the hinge portion as a whole offers substantially the same resistance to stress in both cases. Moreover, the reduced number of eyelet elements reduces the flexibility.

In the embodiment of Figs. 11, 12 and 13, the problem has been solved by utilizing eyelet elements the branches of which extend obliquely relatively to the hinge pin and by placing one clamp into the neighbourhood of the eyelet or eyelets and at least one other clamp parallel to the first near the end remote from the eyelets but displacing the clamps laterally with regard to each other by half the distance of the limbs of a clamp, the obliquely extending portion of each branch permitting the laterally displaced arrangement of the clamps without substantially increasing the size of the eyelet elements, and thus, without substantially reducing the number of eyelet elements for a given width of the belt end without substantially reducing the flexibility of the hinge portions.

As experience has shown, the resiliency of the hinge fastener may even be higher with eyelet elements having branch portions extending obliquely to the hinge pin and especially when a violent pull or impact arises. In fact, it is possible to maintain or even to reduce the size of the individual eyelet elements without reducing the size of the clamps themselves, which is important. It should be noted that the pull is exerted on the hinge and indirectly on the clamps; the inclined pull is counteracted by the element positioned in front which itself is oblique.

It should be clearly understood that the embodiments described and illustrated are given by way of example only. Many modifications, omissions and additions are possible without departing from the spirit and scope of the invention.

I claim:

1. A hinge portion for a fastener for hingedly connecting the ends of industrial belts, comprising a row of eyelet elements each having two opposed branches for sandwiching an end of a belt between them, a single eyelet on each alternate eyelet element, two eyelets on each of the remaining eyelet elements, the eyelets being in substantial alignment for receiving a hinge pin, successive eyelets being spaced from one another for receiving between them corresponding eyelets of another hinge portion, a plurality of bridge portions including a weakened area, one branch of each eyelet element being joined by one of said bridge portions to a branch of an adjacent eyelet element, the said branches and the intermediate bridge portion being unitary, the opposite branches of the eyelets being separate from one another, each branch of each eyelet element having holes for passing fastening means with play therethrough and through the belt for attaching said eyelet element to the end of said belt, and at least one prong in each branch struck inwardly towards the opposite branch, each prong being inclined at an acute angle to the plane of the branch from which it is struck and having its end rounded and directed towards the hinge pin when received by the eyelet, the acute angle being so small that in use each prong bears against an adjacent surface of the belt end.

2. A hinge portion for a fastener for hingedly connecting the ends of industrial belts, comprising a row of eyelet elements each having two opposed branches for sandwiching an end of a belt between them, a single eyelet on each alternate eyelet element, two eyelets on each of the remaining eyelet elements, the eyelets being in substantial alignment for receiving a hinge pin, successive eyelets being spaced from one another for receiving between them corresponding eyelets of another hinge portion, a plurality of bridge portions including a weakened area, one branch of each eyelet element being joined by one of said bridge portions to a branch of an adjacent eyelet element, the said branches and the intermediate bridge portion being unitary, the opposite branches of the eyelets being separate from one another, each branch of each eyelet element having at least one pair of holes for receiving a staple-like clamp passing with play through both of said branches and the belt for attaching said eyelet element to the belt end, and at least one prong in each branch struck inwardly towards the opposite branch, each prong being inclined at an acute angle to the plane of the branch from which it is struck and having its end rounded and directed towards the hinge pin when received by the eyelet, the acute angle being so small that in use each prong bears against an adjacent surface of the belt end.

3. A hinge portion as claimed in claim 2, wherein the opposed branches of the eyelet elements are spread apart for facilitating arranging the end of the belt between the said branches and are adapted to be pressed into substantially parallel position relative to each other for sandwiching the end of the belt between them, a pair of holes of at least one branch of each eyelet element being elongated in the direction substantially perpendicular to the hinge pin when received by the eyelets for facilitating the insertion of the staple-like clamp into the said pair of elongated holes while the branches are spread apart, the holes being of substantially uniform width throughout their entire length, the clamp being stapled through the belt and a corresponding pair of holes of the opposite branch of the eyelet element.

4. A hinge portion as claimed in claim 2, and comprising a staple-like clamp passing through holes in the branches of an eyelet element, the transverse cross section of each limb of the staple-like clamp being circular and uniform except for the extremity of each limb, which is sharp, and for a region where the clamp is bent, the said region having a depression on its internal face, the diameter of the circular cross section being smaller than the diameters of the said holes.

5. Means for hingedly connecting the ends of industrial belts, comprising two hinge portions, a row of eyelet elements on each hinge portion, two opposed branches on each eyelet element of each hinge portion, the branches of one hinge portion straddling one belt end, the branches of the other hinge portion straddling another belt end, a single eyelet on each alternate element of each hinge portion, two eyelets on each of the remaining elements of each hinge portion, the eyelets of each hinge portion being in substantial alignment, successive eyelets of each hinge portion being spaced from one another and receiving between them corresponding eyelets of the other hinge portion, a hinge pin received by the eyelets of the two hinge portions, a plurality of bridge portions including a weakened area, one branch of each eyelet element being joined by one of said bridge portions to a branch of an adjacent eyelet element, the said branches and the intermediate bridge portion being unitary, the opposite branches of the eyelet elements being separate from one another, each branch of each eyelet element having at least one pair of holes receiving a staple-like clamp passing with play through both of said branches and a belt end for attaching said eyelet element to said belt end, and at least one prong in each branch struck inwardly towards the belt surface, each prong being inclined at acute angles to the plane of the said branch and having its end rounded and directed towards the hinge pin, the acute angle being so small that each prong bears against an adjacent surface of the belt end.

6. A hinge portion for a fastener for hingedly connecting the ends of industrial belts, comprising a row of eyelet elements each having two branches for sandwiching an end of a belt between them and at least one eyelet, the eyelets being in substantial alignment for receiving a hinge pin, successive eyelets being spaced from one another for receiving between them corresponding eyelets of another hinge portion, each branch of each eyelet element having at least one pair of holes to receive with play a staple-like clamp passing through both of said branches and the belt end for attaching said eyelet element to said belt end a weakened bridge portion connecting adjacent branches in at least one row of said hinge portions, and at least one prong in each branch struck inwardly towards the opposite branch, each prong being inclined at an acute angle to the plane of the branch from which it is struck and having its end rounded and directed towards the hinge pin when received by the eyelet, the acute angle being so small that in use each prong bears against an adjacent surface of the belt end.

7. A hinge portion for a fastener for hingedly connecting the ends of industrial belts, comprising a row of eyelet elements each having two branches for sandwiching an end of a belt between them and at least one eyelet, the eyelets being in substantial alignment for receiving a hinge pin, successive eyelets being spaced from one another for receiving between them corresponding eyelets of another hinge portion, each branch of each eyelet element extending obliquely to the hinge pin when received by the eyelets and having at least two pairs of holes to receive with play staple-like clamps corresponding in number to said pairs of holes and passing through both of said branches and the belt end for attaching said eyelet element to said belt end, the holes of each pair lying on a line substantially parallel to the hinge pin, each two corresponding holes of the pairs of holes of each branch lying on a line extending obliquely to the hinge pin, whereby the pairs of holes of each branch are laterally displaced relatively to each other, and at least one prong in each branch struck inwardly towards the opposite branch, each prong being inclined at an acute angle to the plane of the branch from which it is struck and having its end rounded and directed towards the hinge pin when received by the eyelet, the acute angle being so small that in use each prong bears against an adjacent surface of the belt end.

8. A hinge portion for a fastener for hingedly connecting the ends of industrial belts, comprising a row of eyelet elements each having two branches for sandwiching an end of a belt between them and at least one eyelet, the eyelets being in substantial alignment for receiving a hinge pin, successive eyelets being spaced from one another for receiving between them corresponding eyelets of another hinge portion, each branch of each eyelet element having at least one pair of holes to receive with play a staple-like clamp passing through both of said branches and the belt end for attaching said eyelet element to said belt end, and at least one prong in each branch struck inwardly towards the opposite branch, each prong being inclined at an acute angle to the plane of the branch from which it is struck and having its end rounded and directed towards the hinge pin when received by the eyelet, the acute angle being so small that in use each prong bears against an adjacent surface of the belt end, said pairs of holes in said branhes being laterally displaced by substantially half the distance between the centers of the holes of each pair, at least one of the prongs being substantially in alignment with a line passing through the center of said branch at right angles to the axis of the hinge pin.

9. A hinge portion for a fastener for hingedly connecting the ends of industrial belts, comprising a row of eyelet elements each having two opposed branches for sandwiching an end of a belt between them, a single eyelet on each alternate eyelet element, two eyelets on each of the remaining eyelet elements, the eyelets being in substantial alignment for receiving a hinge pin, successive eyelets being spaced from one another for receiving between them corresponding eyelets of another hinge portion, a plurality of bridge portions including a weakened area, one branch of each eyelet element being joined by one of said bridge portions to a branch of an adjacent eyelet element, the said branches and the intermediate bridge portion being unitary, the opposite branches of the eyelet elements being separate from one another, each branch of each eyelet element having at least one pair of holes for receiving a staple-like clamp passing with play through both of said branches and the belt for attaching said eyelet element to the belt end, and at least one prong in each branch struck inwardly towards the opposite branch, each prong being inclined at an acute angle to the plane of the branch from which it is struck and having its end rounded and directed towards the hinge pin when received by the eyelet, the acute angle being so small that in use each prong bears against an adjacent surface of the belt end, a major portion of each branch of each eyelet element extending obliquely to the hinge pin when received by the eyelets, each branch having at least two pairs of holes arranged for passing at least two staple-like clamps through two corresponding pairs of holes of the two opposed branches of an eyelet element and through the belt when arranged between the said branches, the holes of each pair lying on a line substantially parallel to the hinge pin, and each two corresponding holes of the pairs of holes of each branch lying on a line extending obliquely to the hinge pin, whereby the pairs of holes of each branch are laterally displaced relatively to each other.

10. A hinge portion as claimed in claim 9, wherein the pairs of holes in said branches are lateraly displaced by substantially half the distance between the centers of the holes of each pair, at least one of the prongs being substantially in alignment with a line passing through the center of said branches at right angles to the axis of the hinge pin.

References Cited in the file of this patent

UNITED STATES PATENTS

| | | |
|---|---|---|
| 90,876 | Rudiger | June 1, 1869 |
| 399,962 | Avery | Mar. 19, 1889 |
| 619,514 | Southwick | Feb. 14, 1899 |
| 1,282,845 | Johnson | Oct. 29, 1918 |
| 1,545,460 | Stevens | July 7, 1925 |
| 2,099,831 | Taber | Nov. 23, 1937 |
| 2,624,085 | Feiner | Jan. 6, 1953 |

FOREIGN PATENTS

| | | |
|---|---|---|
| 38,268 | Great Britain | 1913 |
| 329,806 | Germany | Nov. 30, 1920 |
| 958,296 | France | Sept. 12, 1949 |